United States Patent [19]

Ohta et al.

[11] 4,294,528

[45] Oct. 13, 1981

[54] AUTOMATICALLY CONTROLLED ELECTRONIC FLASH DEVICE

[75] Inventors: Yoshiharu Ohta; Mikio Naya, both of Izumi, Japan

[73] Assignee: Minolta Camera Kabushiki Kaisha, Osaka, Japan

[21] Appl. No.: 67,968

[22] Filed: Aug. 20, 1979

[30] Foreign Application Priority Data

Aug. 23, 1978 [JP] Japan .................. 53-103054

[51] Int. Cl.$^3$ ............... G03B 15/05; H05B 41/32
[52] U.S. Cl. .................. 354/33; 354/60 F; 354/128; 315/133; 315/151; 315/241 P
[58] Field of Search .............. 354/32, 33, 127, 128, 354/145, 289, 34, 35, 60 F, 53, 60 E, 6 L; 315/241 P, 129-136, 151

[56] References Cited

U.S. PATENT DOCUMENTS

| | | | |
|---|---|---|---|
| 3,688,659 | 9/1972 | Takishima et al. | 354/128 |
| 3,979,639 | 9/1976 | Adams, Jr. | 315/241 P |
| 3,999,193 | 12/1976 | Hasegawa | 354/128 X |
| 4,163,924 | 8/1979 | Hasegawa et al. | 354/127 X |

*Primary Examiner*—L. T. Hix
*Assistant Examiner*—William B. Perkey
*Attorney, Agent, or Firm*—Wolder, Gross & Yavner

[57] ABSTRACT

An automatic electronic flash device for use with a camera includes a flash tube carried by a housing. A battery is carried by the housing as a source of electric supply. A capacitor is connected to the flash tube to fire it when discharged. A circuit is used to automatically adjust the amount of light emitted from said flash tube upon the firing of the tube. The circuit includes a light receiving element arranged to receive light reflected from a photographic object upon the firing of the tube. The information of distance from the camera to an object to be photographed is fed to the circuit as a function of the amount of light received. A switch is connected to the circuit to cause it to vary the amount of light emitted from the flash tube. A calculator enables calculation of a plurality of combinations of aperture settings and distance setting in response to a film speed setting, so that selection of a desired film speed will result in indication of a desired aperture setting and distance setting. Light emitting diodes are disposed adjacent to the calculator for indication of one of the combinations calculated by the calculator. Another switch connects one of the light emitting diodes to the battery for selective energization thereof in association with the switching of the above switch connected to the circuit.

8 Claims, 4 Drawing Figures 4,294,528

AUTOMATICALLY CONTROLLED ELECTRONIC FLASH DEVICE

BACKGROUND OF THE INVENTION

The present invention relates generally to devices used with photographic equipment, and more specifically to an automatically controlled electronic flash device used as an artificial source of light necessary to illuminate photographic objects.

Automatically controlled electronic flash devices have heretofore been used as a source of artificial light. In such prior devices a predetermined amount of light is produced from an electronic flash tube. The amount of light is automatically adjusted in accordance with the output of a light measuring device used to represent the distance from a camera to a photographic object. One such prior art device is for example shown in published Japanese Utility Model No. Sho 49-148052. The device disclosed in the Japanese publication relates to an automatically controlled electronic flash device which permits a selection between two aperture openings to be set on a camera for a film having a particular speed or sensitivity. The device is provided with a calculator having a pair of neon tubes used to indicate the aperture setting (f-number) which is representative of the aperture to be set on the camera, as well as the maximum permissable distance or range from the camera to the photographic object. In this prior device indicia is used to represent the distance between the camera and the object. Similarly indicia representing the f-number (aperture setting) is also used. The f-number indicia are movable with respect to the distance setting indicia and also movable relative to the two neon tubes depending upon the setting of a particular film speed or sensitivity. The neon tubes are selectively lit depending upon the position of a manual switching member. When the manual switching member is set to a first position and a certain film sensitivity or speed is set, a particular combination of aperture setting and maximum permissable distance between the camera and the object is indicated by one of the neon tubes being lit. When the manual switching member is set to a second position, with the same film speed or sensitivity being set, another combination of aperture setting and maximum permissible distance between the camera and the object is indicated by the other neon tube being lit. The use of the neon tubes or lamps provides the operator, or photographer, with the ability to see the selected aperture setting and maximum permissable distance between the camera and the object even when using the device in the dark.

The disadvantage of this prior device, however, relates to the fact that the neon tubes are connected to opposite terminals of a capacitor used for storing electric charge to energize a flash tube. Accordingly, the neon lamps cannot be lit unless the potential across the capacitor reaches a level sufficient to allow the flash tube to emit a sufficient quantity of light. In other words, unless the capacitor is fully charged the combination of proper aperture setting to be chosen on the camera and the maximum permissable distance between the camera and the object for a particular film speed, cannot be indicated. Therefore, soon after the flash tube has reached a condition for emitting light, imaging using the flash as a source of artificial light may not be possible.

It is accordingly an object of the present invention to provide an improved automatic electronic flash device which overcomes the disadvantages of the prior art.

It is a more specific object of the present invention to provide an automatic electronic flash device which provides for the selection of a particular aperture size to be set on a camera for any selected film speed, and which, independent of the condition of charge on the capacitor used to fire the flash tube, indicate the aperture size to be set on the camera and the maximum permissable distance between the camera and the object which is available under the conditions for the selected film speed and a set aperture size.

SUMMARY OF THE INVENTION

In order to accomplish the foregoing objectives the automatic electronic flash device of the present invention is provided with means to automatically adjust the amount of illumination provided by the flash in accordance with the selected film speed and a camera-to-object distance. The device includes a light receiving element which receives light from an object to be photographed. The information of the distance is obtained as a function of the intensity of light which is received by the light receiving element during the firing of the flash tube. Manually operable first switch means is used to change the amount of flash illumination during firing of the flash tube, depending on the set position of the first switch means so that the flash device will allow a plurality of aperture sizes to be selectively set on a camera for a desired film speed. A calculator is provided on the housing of the flash device and includes indicia to represent film speed, f-numbers and the maximum permissable distance between the camera and the object. The various indicia are arranged with respect to each other such that designations or settings of a desired film speed will specify a combination of f-numbers (aperture settings) and the maximum permissable distance setting, which would be available for the preselected film speed. A plurality of light emitting elements are also provided on the housing adjacent the calculator. The light emitting elements are selectively connected to a battery for energization by second switch means interconnected with the first switch means. The light emitting elements are arranged so that when they are selectively energized a particular combination of f-number or aperture size settings for a predetermined film speed will be appropriately indicated. Thus, the proper indication will be made in response to the operation of the first switch means to change the amount of flash illumination, independent of whether or not the capacitor used to fire the flash tube has been charged to an adequate voltage level.

The foregoing objects, advantages and features of the present invention will become more apparent from the following description of the invention taken in connection with the accompanying drawings.

BREIF DESCRIPTION OF THE DRAWINGS

DESCRIPTION OF THE PREFERRED EMBODIMENT

Figure 1:
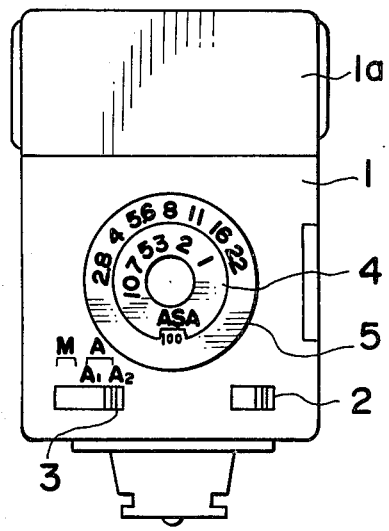
FIG. 1 is a rear elevational view of the automatically controlled electronic flash device of the present invention.

FIG. 1 illustrates the external rear surface of the automatically controlled electronic flash device of the present invention. A flash device body 1 includes an upper flash portion 1a carrying an electronic flash tube (not shown). A manually operable switch member 2 is carried on the flash device body 1 and is used to operate a power source switch. An auto-manual switch member 3 (hereinafter referred to as the "A-M switch member") is also carried on the flash device body 1. The A-M switch member 3 can be set to any position within two separate ranges, identified in the drawing as either the "A" range or the "M" range. When the A-M switch member 3 is set to the "A" range the device will be in an automatic mode so that the amount of light to be emitted from the flash tube for illuminating an object will be automatically controlled to provide an optimum exposure. When the A-M switch member 3 is set to the "M" range the device will be in a manual mode so that the flash device can emit light to full extent. Within the "A" range the A-M switch 3 can be moved between two positions A1 or A2. The aperture setting of the lens structure of the camera can therefore be selected in two different positions. A distance setting dial 4 carries indicia to indicate distance (illustrated in FIG. 2b in units of meters), and aperture setting dial 5 carries indicia representative of aperture settings. Additionally, there is means for indicating selected film speeds as indicated by an ASA setting. Through the use of the film speed setting, the aperture setting dial and the distance setting dial an operator or photographer can determine the relationship between the desired aperture setting and the distance from the camera to the object for a particular chosen film speed.

Figure 2A:
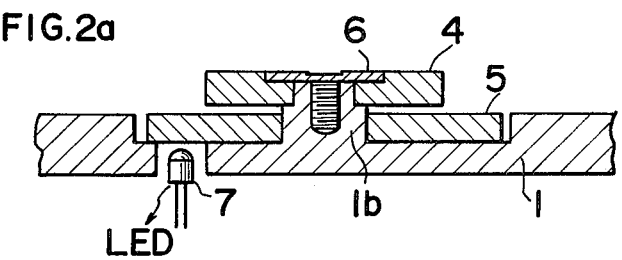
FIG. 2a is a longitudinal sectional view of the calculator dial shown in FIG. 1.

FIG. 2 illustrates the structure of the calculator shown in FIG. 1, which includes the distance setting dial 4 and the aperture setting dial 5. The distance setting dial 4 is attached to the flash device body 1 by set screw 6. The aperture setting dial is arranged below the distance setting dial 4 and is rotatably carried about a threaded portion 1b of the set screw 6.

Indicia 4a to indicate distance settings, indicia 5a to indicate desired aperture settings and indicia 5b to indicate selected film speed are provided on the dials 4 and 5 in such a manner that when the aperture setting dial 5 is turned through a particular angle, which will be determined by the selected film speed indicated by the cut-out portion 4b on the distance setting dial 4 (shown for example as ASA setting 100 in FIG. 2b), the product of a distance setting with an aligned aperture setting 5a will correspond to a maximum guide number (for example, Guide No. 20) in the flash device. A potentiometer 25 is interconnected with dial 5 so that the resistance thereof varies with the selected film speed.

Aperture setting indicating dial 5 is preferably made of a semi-transparent (for example, milky-white), synthetic resin, so that two of the aperture settings carried on the aperture indicating dial 5 will be selectively illuminated by light emitting diodes 7 and 8 which are disposed below the dial 5.

Figure 3:
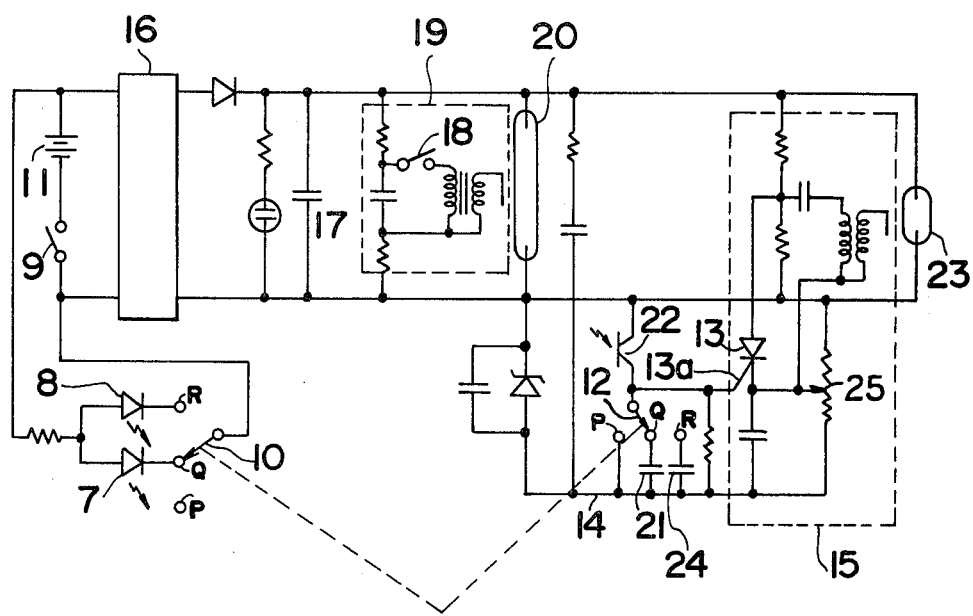
FIG. 3 is a schematic block diagram of the electric circuit for the automatically controlled electronic flash device illustrated in FIG. 1.

Light emitting diodes 7 and 8 are selectively energized by a change-over switch 10 which is connected through a power source switch 9 to a power supply 11, as illustrated in FIG. 3. Change-over switch 10, along with another change-over switch 12, is interconnected to A-M switching member 3, so that when A-M switching member 3 is set in the "M" mode, change-over switches 10 and 12 will both be connected to terminal P. In this mode, light emitting diodes 7 and 8 will not be illuminated since the connection to the power supply 11 will be interrupted. Accordingly, no indicia on the aperture setting dial 5 will be illuminated. A gate 13a of a thyristor 13 is shortcircuited to a lower potential line 14, so that a trigger circuit 15 including thyristor 13 will reman inoperative. Consequently, a flash operation without automatic flash control will be effected. In other words, capacitor 17 which has been previously charged to a predetermined level through a DC-DC converter circuit 16 from power source 11 will discharge through flash tube 20 in association with operation of trigger circuit 19 which is caused by a synchronizing switch 18 which has been brought to a closed position. The flash device will therefore emit a quantity of light determined by its predetermined guide number.

When A-M switching member 3 is set at the "A1", position change-over switches 10 and 12 will both be connected to the terminals Q. Accordingly, only light emitting diode 7 will be energized so that an aperture setting (f5.6 as illustrated in the drawing) which is positioned above diode 7 will be illuminated. The illuminated aperture setting should then be set on the lens system of the camera. Simultaneously, the maximum permissable distance between the camera and the photographic object will be indicated as the one on the distance setting dial 4 that is aligned with the illuminated aperture setting on dial 5. Accordingly, in FIG. 2b the maximum permissable distance setting for aperture setting 5.6 will be 3 meters. Gate 13a of thyristor 13 is connected to capacitor 21 so that the automatic controlling operation in accordance with the aperture setting on the camera lens system will be effected.

When light is emitted from the flash tube 20 a certain portion of the emitted light will be reflected by the photographic object and will act on a light receiving element 22. Charge will then begin to build up across capacitor 21 with a current proportional to the intensity of the light received by element 22. When the potential across the capacitor reaches a predetermined level determined by the resistance of potentiometer 25 thyristor 13 will begin to conduct. Trigger circuit 15, including thyristor 13 will then begin to operate so that a bypass discharge tube 23 will be allowed to discharge. Flashing of tube 20 will therefore cease resulting in the automatic control of the flash device. Since the intensity of light which is received by light receiving element 22 is inversely proportional to the square of the distance between the camera and the object being photographed, the closer the object is to the camera the sooner the flash tube 20 will stop firing.

Figure 2B:
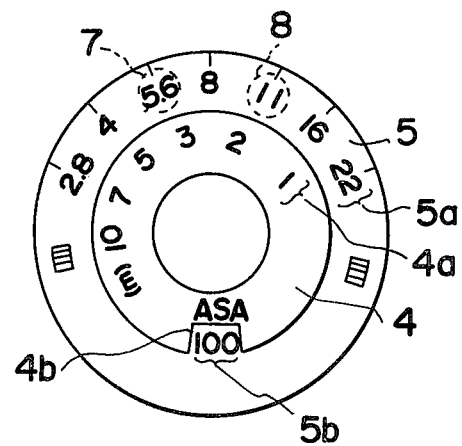
FIG. 2b is an enlarged plan view of the calculator dial shown in FIG. 1.

When A-M switch member 3 is set to the "A2" position change-over switches 10 and 12 will both be connected to terminals R. In this mode current will be supplied to the other light emitting diode 8, and an aperture setting positioned above this diode (f11 as illustrated in FIG. 2b) will be illuminated. The indicia which is on the distance setting dial 4 and which is aligned with the illuminated setting on dial 5 will indicate the maximum permissable distance between the camera and the object. In the case where light emitting diode 8 is energized and, as illustrated in FIG. 2b aperture setting 11 is illuminated, the maximum permissable distance is indicated as 2 meters. Gate 13a of thyrister 13 in this case is connected to capacitor 24 and the automatic control for ceasing operation of flash tube 20 will be initiated in the same manner as described above.

It should be understood by those skilled in the art that light emitting diodes could be replaced by other illuminating means for purposes of indicating the aperture setting on dial 5. Similarly, the aperture setting indicator may be arranged radially outward of dial 5 rather than beneath the dial. Other alternatives could be to indicate the desired aperture setting through the use of different colored illuminating means.

In the embodiment described above the particular setting for the aperture opening is clearly indicated and cannot be mistakenly confused with other aperture settings. This is accomplished through the use of the illuminating means, i.e. the light emitting diodes. The aperture setting to be chosen is easily seen in areas where there is little ambient light and is therefore of unique advantage. The present invention is therefore well suited for situations in which only a single diaphram value is to be indicated.

While the present invention has been described and illustrated with respect to a certain preferred embodiment, it will be apparent to those skilled in the art, after understanding the purposes of the invention, that various changes and modifications may be made without departing from the spirit and scope of the invention, and it is therefore intended to cover such changes and modifications in the appended claims.

What is claimed is:

1. An automatic electronic flash device for use with a camera, comprising:
   a housing;
   an electronic flash tube provided in said housing;
   a battery provided in said housing as a source of electric supply;
   a DC-DC converter circuit connected to said battery for generating a high DC voltage;
   a capacitor connected to said DC-DC converter circuit to be charged up to the DC voltage and connected to said flash tube to energize said tube when discharged;
   a manual switching member provided on said housing, said switching member having a plurality of settable positions;
   calculator means carried on said housing for calculation of a plurality of combinations of aperture settings and distance settings in response to a film speed setting;
   a plurality of illuminators each of which is associated with said calculator means for indication of one of said combinations calculated by said calculator means;
   a control circuit having a light receiving element, said control circuit adapted for adjusting the amount of light emitted from said flash tube in accordance with a film speed setting and the intensity of light which is reflected by an object to be photographed and received by said light receiving element during the firing of said flash tube;
   means connected to said control circuit for adjusting the amount of light emitted from said tube in accordance with the setting of said manual switching member; and
   means interlocked with said manual switching member for selectively and directly connecting one of said illuminators to said battery for energization thereof in accordance with the setting of said manual switching member.

2. The automatic flash device according to claim 1, wherein said calculator means comprises a pair of coaxially arranged first and second disks, said first disk mounted on said housing in a fixed position and carrying indicia to indicate distance settings, an indexing portion carried on said first disk for indicating a selected film speed, and said second disk mounted on said housing for relative rotatable movement with respect to said first disk and carrying indicia to indicate aperture sizes and indicia to indicate selected film speed by said indexing portion of said first disk.

3. The automatic electronic flash device in accordance with claim 2, wherein said second disk is semitransparent and wherein each of said illuminators is disposed below said second disk for illuminating the aperture setting of one of said combinations calculated by said calculator.

4. The automatic electronic flash device in accordance with claim 1 wherein said illuminators are adapted to emit lights of different colors upon selective energization thereof.

5. The automatic electronic flash device according to claim 1 further comprising a manually operable power switch connected between said illuminators and said battery and between said capacitor and said battery.

6. The automatic flash device according to claim 1, wherein, said means interlocked with said manual switching member for energizing one of said illuminators is a switch.

7. The automatic flash device according to claim 6, wherein said illuminators are located on said housing adjacent said calculator so that one of said combinations calculated by said calculator means will be indicated by one of said illuminators.

8. The automatic flash device according to claim 7, wherein said calculator means comprises a pair of coaxially arranged first and second dials, said first dial mounted on said housing in a fixed position carrying distance setting indicia, an indexing portion carried on said first dial for indicating a selected film speed, and said second dial mounted on said housing for relative rotatable movement with respect to said first dial and carrying aperture setting indicia.

* * * * *